UNITED STATES PATENT OFFICE.

LUDWIG ROTH, OF WETZLAR, PRUSSIA, GERMANY.

MANUFACTURE OF CEMENT.

SPECIFICATION forming part of Letters Patent No. 294,080, dated February 26, 1884.

Application filed October 1, 1883. (No specimens.)

*To all whom it may concern:*

Be it known that I, LUDWIG ROTH, a subject of the Emperor of Germany, residing at Wetzlar, Prussia, Germany, have invented certain new and useful Improvements relating to Cements, of which the following is a specification.

The different trials which have been made by various parties to produce cement by burning a mixture of blast-furnace cinder and lime or chalk have not led to the practical result of obtaining a material which in every respect was equal to the Portland cement. The inventor, by the method hereinafter described, which consists, essentially, in adding a new ingredient to the mixture, either in dry or wet condition, has succeeded in producing a cement which in quality not only is equal to the best Portland cement, but in many respects even surpasses the same. This method by the dry way is the following: Blast-furnace cinder, (a secondary product of the raw iron manufacture,) together with carbonate of lime—as limestone, burned lime, or chalk—all in a finely-pulverized condition, are mixed intimately one with another. To this mixture I add a solution of carnallite—a substance found mixed with rock-salt in masses at Stassfurth, in Prussia, Saxony. The same substance may be obtained by evaporation of the mother-liquor of sea-salt. Instead of carnallite, I can use other salt compounds containing alkaline chlorides. So much of this solution is added as is required to form a stiff paste, of which bricks are made, which, after being dried, are burned and pulverized in the same way as generally practiced in the manufacture of Portland cement. Generally by this method a mixture of, say, one hundred (100) pounds cinder-powder made of a strongly-basic cinder (containing about fifty per cent. of lime and thirty-five per cent. of silicic acid) with one hundred and thirty-five (135) pounds of limestone or chalk and an addition of fifteen to twenty pounds of a saturated solution of carnallite will produce an excellent cement. The proportions should be varied with different cinders. The quantity of lime should be such that the mixture will contain that substance in the same proportion as a good Portland cement, or rather surpass it a little. By an analysis of the blast-furnace cinder the requisite additional quantity of lime may then easily be calculated. The quantities of the chloralkalies, or of the salts that contain such substances, to be added to the mixture may be best determined in every case by trials. Relatively small additions have a favorable influence on the quality of the cement. A percentage of only a few tenths of one per cent. will be of advantage; but it is preferable to increase the percentage to one per cent., or even more, of the dry salt. If too much is used, the cement will become too hygroscopic. By the wet way the addition of the chloralkali is made by the natural brine of the same. If this natural brine does not contain sufficient salt in solution, it must be concentrated by evaporation or strengthened by an addition of chloralkalies.

Should the blast-furnace cinder not contain sufficient argillaceous earth, (which substance also has a material influence on the quality of the cement,) it is recommended to add to the mixture of the raw materials bauxite, in accordance with the method described in United States Letters Patent No. 270,608, dated January 16, 1883.

Modifications may be made in the details. If a saturated solution of the alkaline chloride gives too little or too much moisture to the paste, more water may be added in the one case, or a portion of the salt may be added in a dry and finely-pulverized condition in the other.

The masses into which the material in the pasty form may be molded may be of various sizes and shapes.

I claim as my invention—

The method of making cement by burning and pulverizing a mixture of blast-furnace cinder, carbonate of lime, and an alkaline chloride, substantially as herein specified.

In testimony whereof I have hereunto set my hand, at Frankfort-on-the-Main, this 21st day of August, 1883, in the presence of two subscribing witnesses.

LUDWIG ROTH.

Witnesses:
A. S. HOGUE,
J. GRUND.